(12) United States Patent
Kahle

(10) Patent No.: US 8,537,279 B2
(45) Date of Patent: Sep. 17, 2013

(54) DIGITAL MICROFORM IMAGING APPARATUS

(75) Inventor: Todd A. Kahle, Hartford, WI (US)

(73) Assignee: e-ImageData Corp., Hartford, WI (US)

( * ) Notice: Subject to any disclaimer, the term of this patent is extended or adjusted under 35 U.S.C. 154(b) by 0 days.

(21) Appl. No.: 13/560,283

(22) Filed: Jul. 27, 2012

(65) Prior Publication Data

US 2012/0293845 A1    Nov. 22, 2012

Related U.S. Application Data

(63) Continuation of application No. 11/748,692, filed on May 15, 2007, now Pat. No. 8,269,890.

(51) Int. Cl.
*G03B 21/10*    (2006.01)

(52) U.S. Cl.
USPC ............................. 348/487; 382/114; 358/487

(58) Field of Classification Search
USPC .......................................... 348/487; 382/114
See application file for complete search history.

(56) References Cited

U.S. PATENT DOCUMENTS

| | | | |
|---|---|---|---|
| 3,836,251 A | 9/1974 | Hertel et al. | |
| 4,870,294 A | 9/1989 | Hasegawa | |
| 5,061,955 A | 10/1991 | Watanabe | |
| 5,133,024 A | 7/1992 | Froessl | |
| 5,137,347 A | 8/1992 | Imai | |
| 5,241,659 A | 8/1993 | Parulski et al. | |
| 5,477,343 A | 12/1995 | Nodelman et al. | |
| 5,586,196 A | 12/1996 | Sussman | |
| 5,647,654 A | 7/1997 | Krzywdziak et al. | |
| 5,726,773 A | 3/1998 | Mehlo et al. | |
| 6,057,941 A | 5/2000 | Furukawa et al. | |
| 6,301,398 B1 | 10/2001 | Kimball et al. | |
| 6,339,483 B1 | 1/2002 | Hoshino et al. | |
| 6,473,205 B1 * | 10/2002 | Pepe | 358/483 |
| 6,476,979 B1 | 11/2002 | Schaack | |
| 7,312,454 B2 * | 12/2007 | Safai et al. | 250/347 |
| 7,425,067 B2 * | 9/2008 | Warden et al. | 351/205 |
| 8,113,658 B2 * | 2/2012 | Warden et al. | 351/212 |
| 8,269,890 B2 * | 9/2012 | Kahle | 348/487 |
| 2004/0012827 A1 | 1/2004 | Fujinawa et al. | |
| 2005/0225725 A1 * | 10/2005 | Warden et al. | 351/216 |
| 2006/0043303 A1 * | 3/2006 | Safai et al. | 250/347 |

(Continued)

FOREIGN PATENT DOCUMENTS

JP    2000356800 A    12/2000

OTHER PUBLICATIONS

S-T Imaging, Inc., "Got Film? ST200X" Brochure, circa 2004, 4 pages.

*Primary Examiner* — Khanh Dinh
(74) *Attorney, Agent, or Firm* — Quarles & Brady LLP

(57) ABSTRACT

A microform imaging apparatus comprising a chassis including a microform media support structure configured to support a microform media within a plane substantially orthogonal to a first optical axis, a fold mirror supported along the first optical axis to reflect light along a second optical axis that is angled with respect to the first optical axis, a lens supported along one of the first and second optical axis, an area sensor supported along the second optical axis, a first adjuster for moving the area sensor along at least a portion of the second optical axis and a second adjuster for moving the lens along at least a portion of the one of the first and second optical axis.

53 Claims, 15 Drawing Sheets

(56) References Cited

U.S. PATENT DOCUMENTS

| | | |
|---|---|---|
| 2007/0103739 A1 | 5/2007 | Anderson, Jr. et al. |
| 2008/0284847 A1 | 11/2008 | Kahle |
| 2008/0288888 A1 | 11/2008 | Kahle et al. |
| 2009/0003854 A1* | 1/2009 | Naoi et al. ............... 399/38 |
| 2012/0008820 A1 | 1/2012 | Kahle et al. |
| 2012/0134029 A1* | 5/2012 | Warden et al. ............ 359/642 |

* cited by examiner

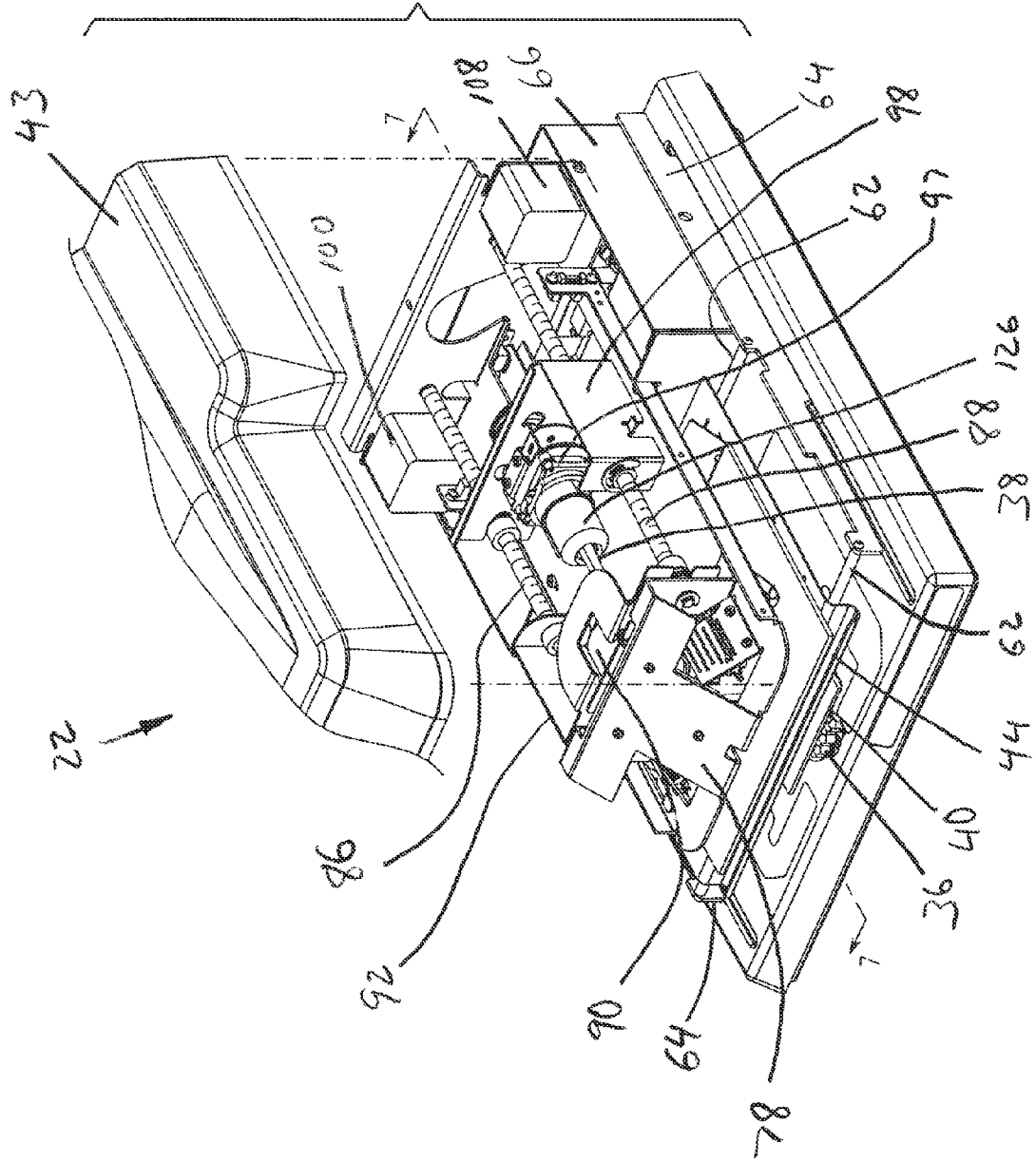

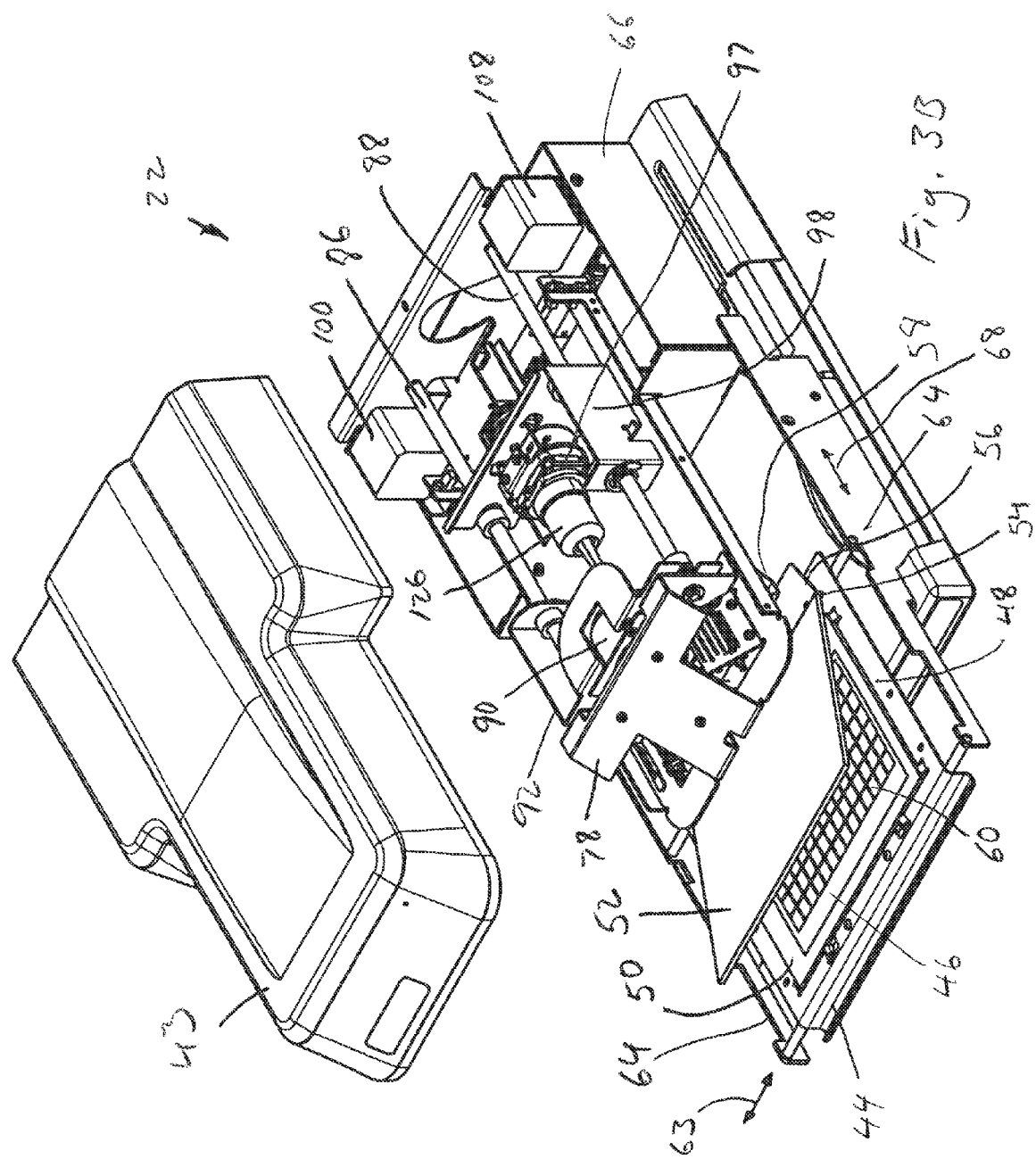

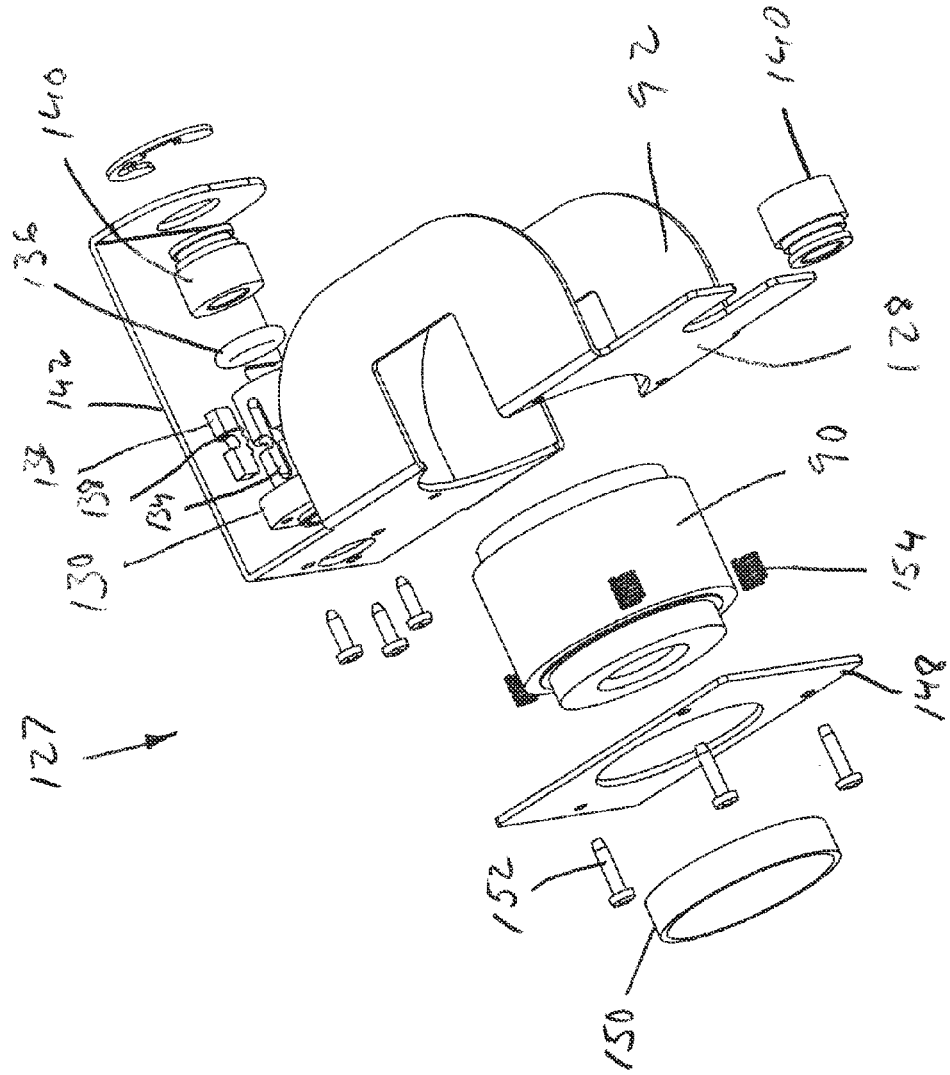

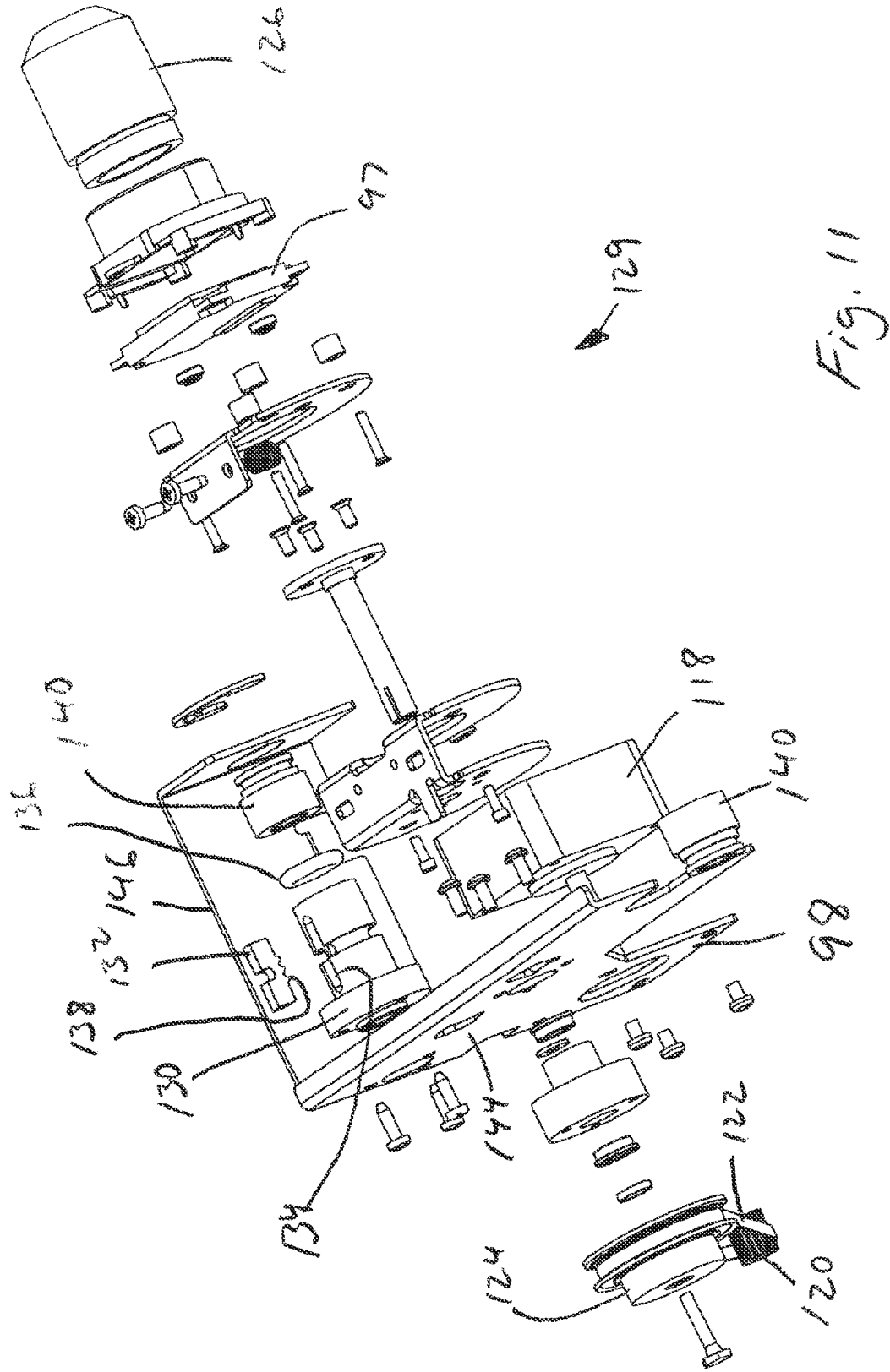

FIG. 12

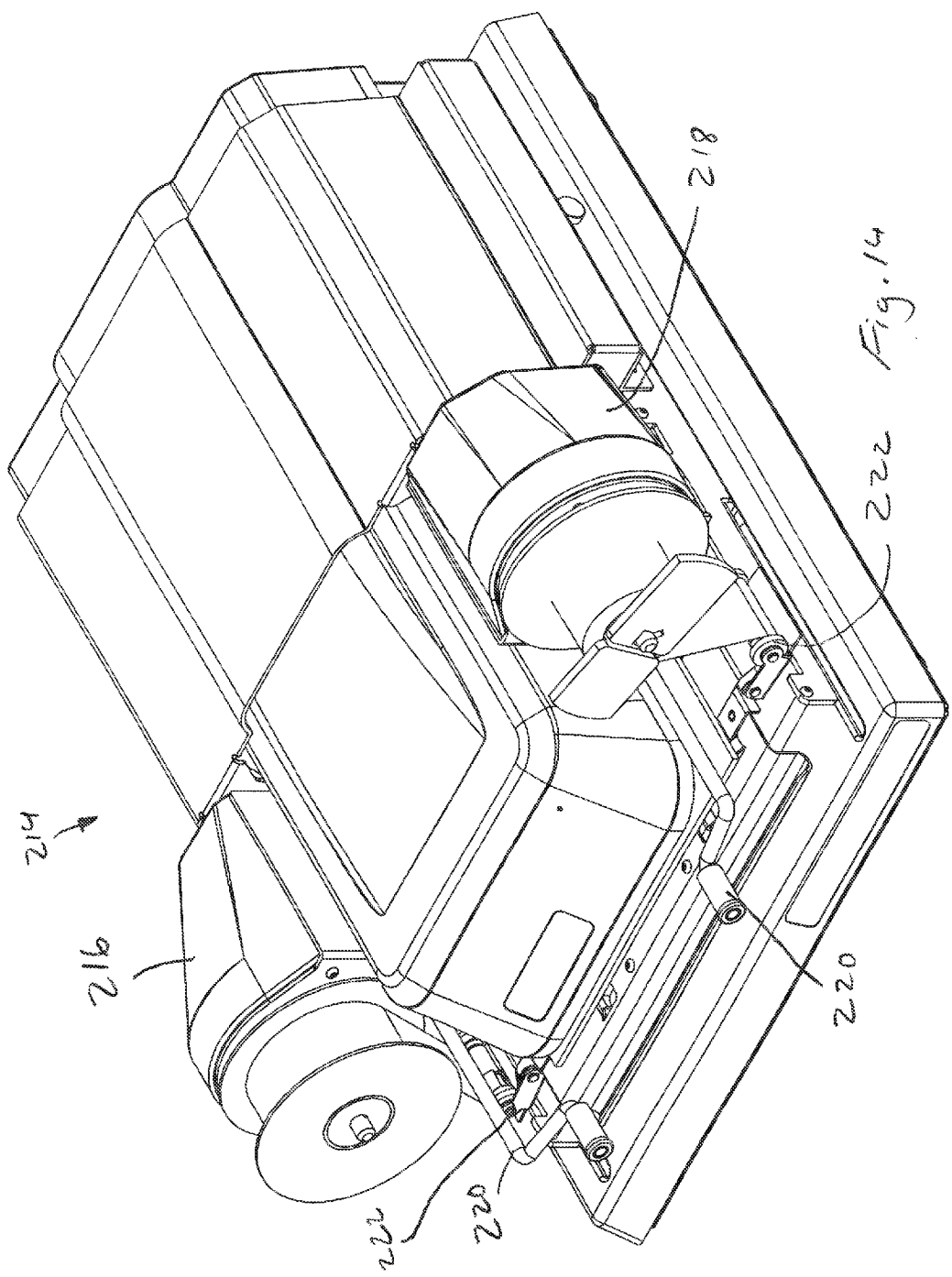

DIGITAL MICROFORM IMAGING APPARATUS

This application is a continuation of U.S. patent application Ser. No. 11/748,692 which was filed on May 15, 2007 now U.S. Pat. No. 8,269,890 and which was titled "Digital Microform Imaging Apparatus" which is incorporated herein by reference in its entirety.

FIELD OF THE DISCLOSURE

The present disclosure relates to a digital microform imaging apparatus.

BACKGROUND OF THE DISCLOSURE

Microform images are useful in archiving a variety of documents or records by photographically reducing and recording the document in a film format. Examples of typical microform image formats include microfilm/microfiche, aperture cards, jackets, 16 mm or 35 mm film roll film, cartridge film and other micro opaques. A microfiche article is a known form of graphic data presentation wherein a number of pages or images are photographically reproduced on a single "card" of microfiche film (such as a card of 3×5 inches to 4×6 inches, for example). Any suitable number of pages (up to a thousand or so) may be photographically formed in an orthogonal array on a single microfiche card of photographic film. The microfiche film may then be placed in an optical reader and moved over a rectilinear path until an image or a selected page is in an optical projection path leading to a display screen. Although other electronic, magnetic or optical imaging and storage techniques and media are available, there exists an extensive legacy of film type records storing the likes of newspapers and other print media, business records, government records, genealogical records, and the like.

Past microfilm readers included an integral display which made the reader quite large, see for example U.S. Pat. No. 5,647,654, . As the number of images that can be put on a standard size varies, and also the size of the record, for example a typical newspaper page is larger than a typical magazine page, images are recorded on film within a range of reduction ratios (original size/reduced size), and aspect ratio (ratio of height to width of the image, or vice versa). A typical microfilm reader may have a range of zoom or magnification available to accommodate a portion of the reduction ratio range; however, this zoom range is limited and does not accommodate all reduction ratios. Further, in a microfilm reader of the type in the '654 patent, the optical system is enclosed and relatively fixed, and cannot be modified by a user to accommodate a range of reduction ratios for which it is not designed. With the adoption of new storage media such as CDs and DVDs, and the prevalent use of desktop computers in libraries and other facilities which store records, it became apparent that a microfilm reader which acts as a peripheral device to a desktop computer and uses the computer's display for displaying the film's images has several advantages. Such a device is shown in U.S. Pat. No. 6,057,941, for example.

One of the advantages is that a single workstation can accommodate a variety of media such as microfiche or other film, optical media such as CDs and DVDs, and other electronic and magnetic media. Another advantage is that a single display is used for displaying a variety of media images. These advantages have led to the development of microfilm readers which work in conjunction with a desktop computer; however, known peripheral device microfilm readers still have the problem of accommodating a relatively large range of reduction ratios for the film images. One known solution is to provide a peripheral device microfilm reader with multiple zoom lenses to cover the full range of magnification required by the relatively large range of reduction ratios. There are several disadvantages to this approach which include the lenses end up missing or misplaced, the microfilm reader becomes undesirably large, and/or special instructions are required to swap out lenses which makes the different zoom lenses difficult to use. An apparatus and/or method is needed which can accommodate a relatively large range of reduction ratios without the need for changing out parts of the apparatus such as the lenses, or without the need for very expensive zoom lenses.

U.S. Pat. No. 6,301,398 discloses an apparatus for processing microfiche images where two carriages ride on common rails, driven by lead screws and small DC servomotors, where one carriage carries the CCD camera board, and the other carriage carries an objective lens mounted upon a vertically moving lens board. In operation, the system's digital controller solves a simple lens equation based upon three variables: lens focal length, optical reduction ratio and pixel resolution at original document scale, or "dots per inch" (dpi). It then drives the Z-axis carriages to their calculated positions. The controller then commands a succession of image scans, each time displacing the lens carriage slightly. It analyzes the images and then returns the lens carriage to the position giving best focus. Although this system can accommodate a variable optical reduction ratio, it has several disadvantages or limitations. Disadvantages include that the lens carriage is iteratively focused which can cause eye strain if a person is viewing the image during the focusing process, and this process takes time. Another disadvantage is that the leads screws include backlash when reversing direction, which can make the iteratively focusing process difficult and/or imprecise, and the '398 patent is absent disclosure which discusses how to rectify such a problem. Yet another disadvantage is that illumination system, film holder, lens and camera are all in line which creates a bulky system. Yet further, the '398 patent is absent disclosure which indicates what range of reduction ratios it can accommodate.

Other noted U.S. Pat. Nos. 5,137,347; 5,726,773; 3,836,251; and 5,061,955. However, these patents, along with the other cited patents, together or separately, fail to disclose or suggest a compact digital microform imaging apparatus which can easily adapt to a broad range of reduction ratios, and also fail to disclose or suggest such a device while offering other modern features leveraging the potential versatility available in such a system used in conjunction with a computer system.

What is needed in the art is a compact and versatile digital microform imaging apparatus which can easily adapt to a broad range of reduction ratios and media types while providing good resolution of the images and ease of use.

SUMMARY OF THE DISCLOSURE

The invention comprises, in one form thereof, a digital microform imaging apparatus which includes a chassis which has a microform media support structure, and an area sensor rotatably connected to the chassis.

The invention comprises, in another form thereof, a digital microform imaging apparatus which includes an approximately monochromatic illumination source transmitting an incident light through a diffuse window along a first optical axis of the apparatus. A microform media support is configured to support a microform media after the diffuse window and along the first optical axis. An approximately 45 degree fold mirror reflects the incident light transmitted through the microform media approximately 90 degrees along a second optical axis. An imaging subsystem includes a lens connected to a first carriage which is linearly adjustable approximately parallel with the second optical axis, and an area sensor connected to a second carriage which is linearly adjustable approximately parallel with the second optical axis.

The invention comprises, in yet another form thereof, a digital microform imaging apparatus which includes a chassis and an imaging subsystem connected to the chassis. The imaging subsystem has a first lead screw and a second lead screw approximately parallel with the first lead screw. Each lead screw is connected to the chassis. The imaging subsystem includes at least one approximately L-shaped carriage with a first leg threadingly coupled to the first lead screw and slidingly coupled to the second lead screw.

An advantage of an embodiment of the present invention is that it provides a compact microfilm viewer/scanner.

Another advantage of an embodiment of the present invention is that it can accommodate a broad range of image reduction ratios without the need to change zoom lenses.

Yet another advantage of an embodiment of the present invention is that it can accommodate a broad range of microform media types such as all film types and micro opaques.

Yet other advantages of an embodiment of the present invention are that it uses an area sensor to sense the image being displayed thereby eliminating the need for scanning individual images with a line sensor, and resulting in high resolution scans in a relatively short amount of time, for example one second.

Yet another advantage of an embodiment of the present invention is that it provides 360° image rotation.

Yet another advantage of an embodiment of the present invention is that it has low energy usage.

Yet other advantages of an embodiment of the present invention are that it has either autofocus or manual focus.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 3A is an exploded perspective view of the digital microform imaging apparatus of FIG. 2;

FIG. 3B is an exploded, fragmentary, perspective view of the digital microform imaging apparatus of FIG. 2, illustrating particularly the X-Y table mobility;

FIG. 9 is a perspective view of the imaging subsystem of the digital microform imaging apparatus of FIG. 2;

FIG. 10 is an exploded perspective view of the lens carriage assembly of FIG. 9, including among other elements, the lens and lens carriage;

FIG. 11 is an exploded perspective view of the rotating sensor carriage assembly of FIG. 10, including among other elements, the rotating sensor and sensor carriage;

FIG. 12 is a screen shot of an embodiment of a computer user interface of the digital microform imaging system of FIG. 1;

FIG. 14 is a perspective view of another embodiment of a digital microform imaging apparatus according to the present invention, particularly illustrating a hand operated roll film microform media support.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE DISCLOSURE

Figure 1:
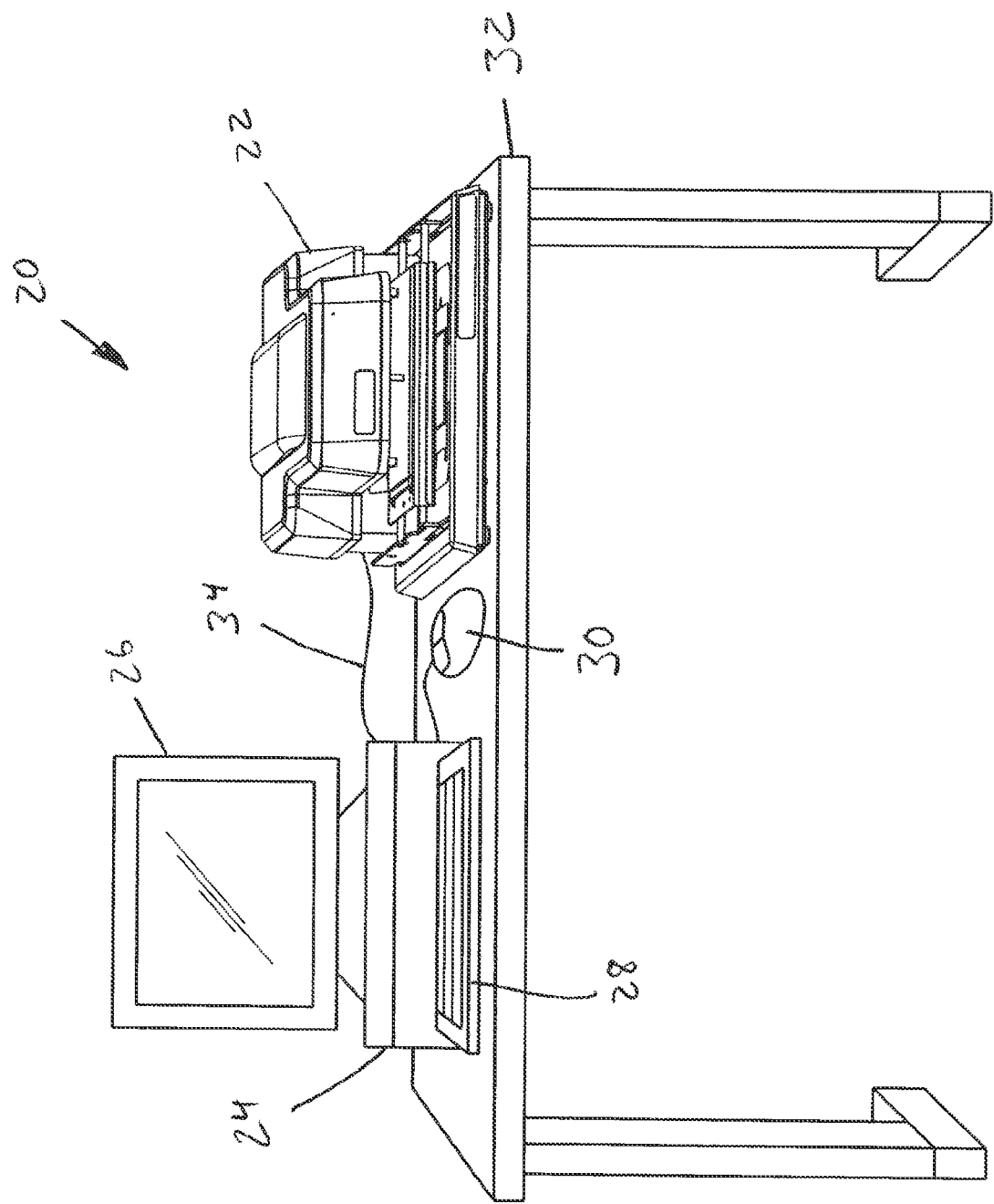
FIG. 1 is a perspective view of an embodiment of a digital microform imaging system according to the present invention.
Figure 2:
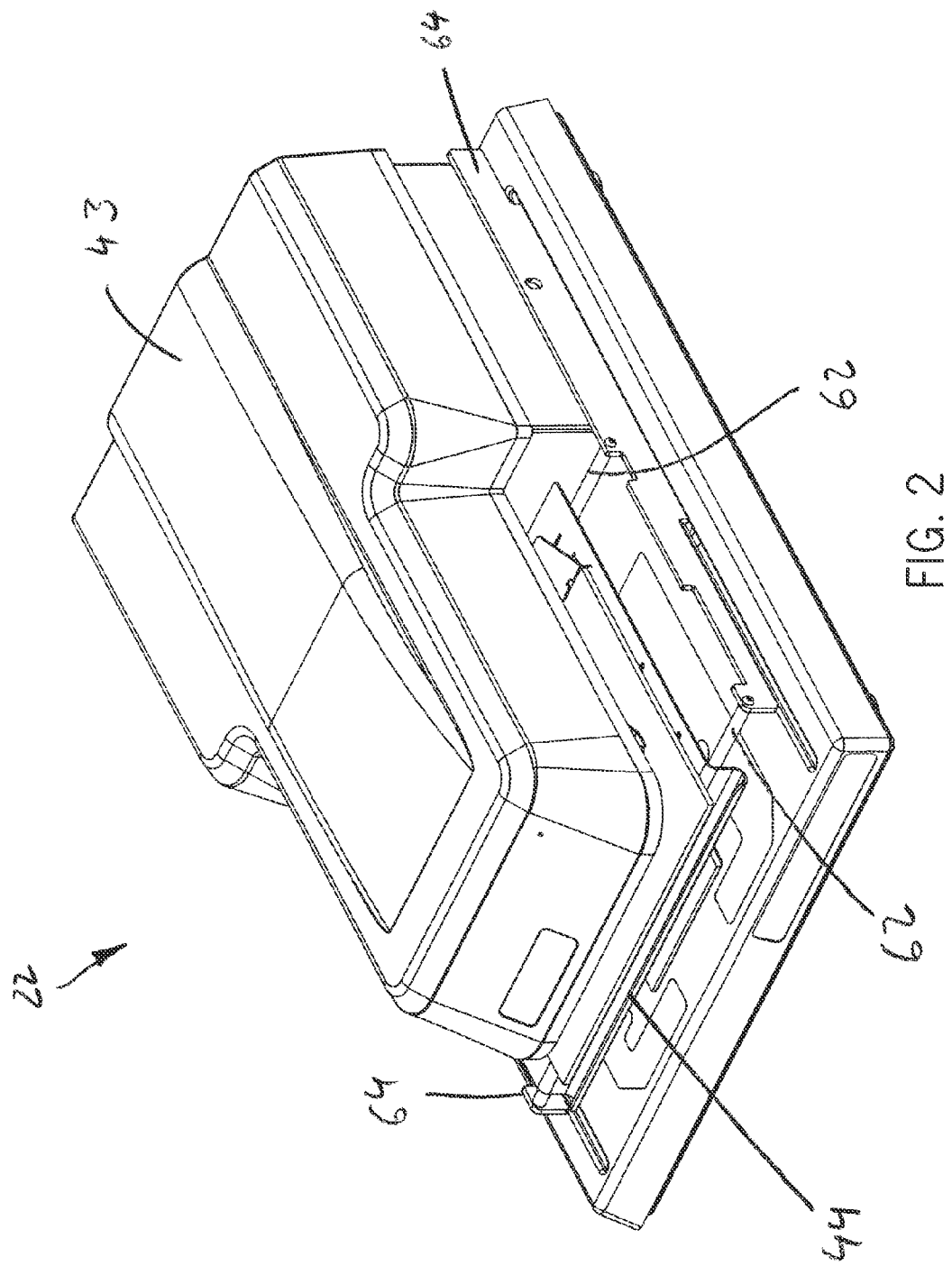
FIG. 2 is a perspective view of the digital microform imaging apparatus used in the system of FIG. 1.
Figure 4:
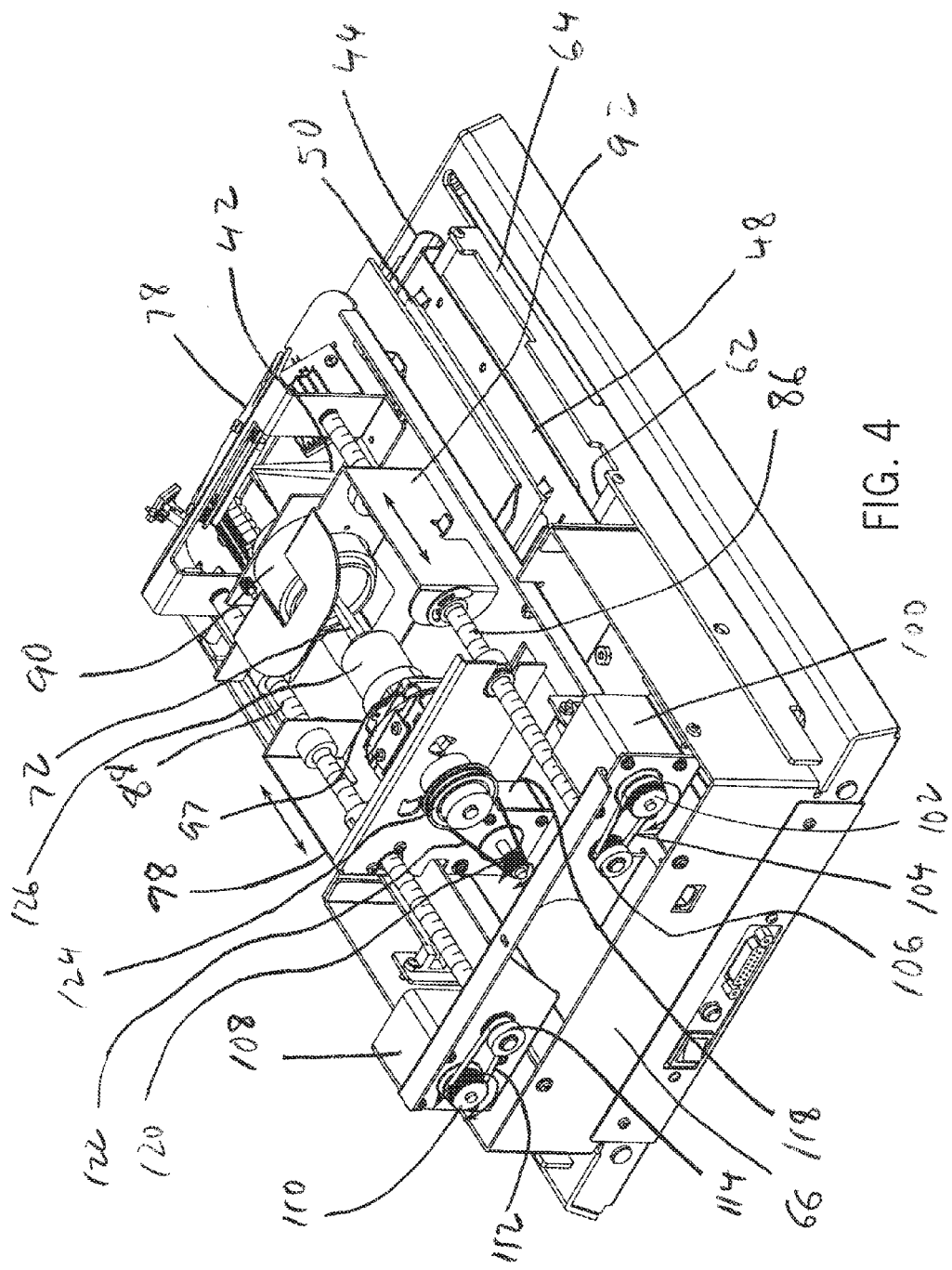
FIG. 4 is a perspective view of the digital microform imaging apparatus of FIG. 2 with the cover removed and as viewed from generally rearward of the apparatus, and particularly illustrating the correlation between the rotational movement of the motors and lead screws, and the translational movement of the carriages.
Figure 5:
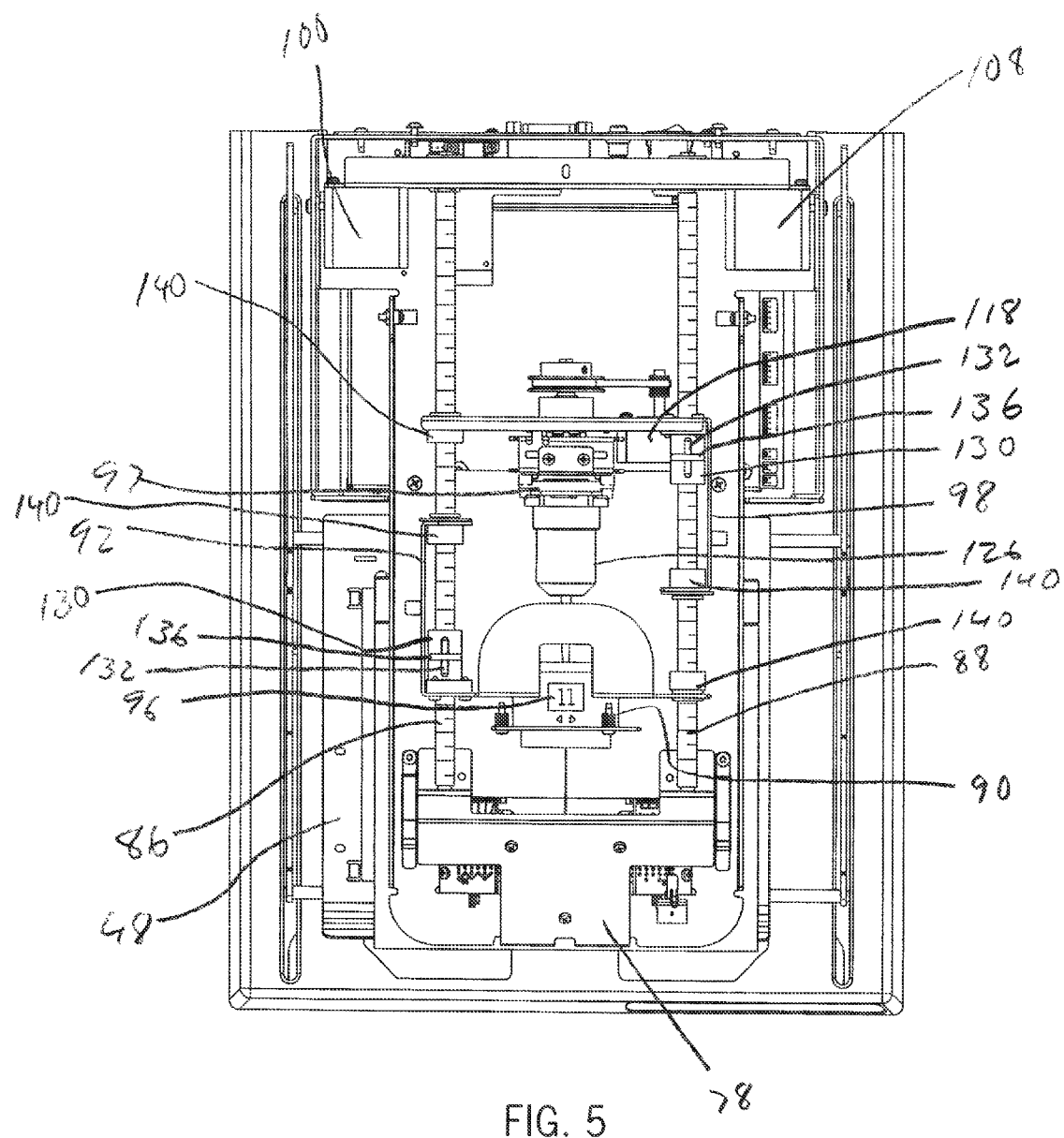
FIG. 5 is a top view of the digital microform imaging apparatus of FIG. 4.

Referring now to the drawings, and more particularly to FIG. 1, there is shown a digital microform imaging system 20 which generally includes digital microform imaging apparatus (DMIA) 22 connected to a computer 24. Computer 24 can include one or more displays 26, and user input devices such as a keyboard 28 and mouse 30. DMIA 22 and computer 24 can be placed on a worksurface 32 of a desk, or other worksurfaces, for convenient access and ease of use. DMIA 22 can be electrically connected to computer 24 via cable 34, which may provide communication using a FireWire IEEE 1394 standard, for example.

Computer 24 can be connected to a printer (not shown) or connected/networked to other computers or peripheral devices (also not shown) to print, store or otherwise convey images produced by DMIA 22. Although cable 34 is described as an electrical type cable, alternatively DMIA 22 and computer 24 can communicate via fiber optics, or wirelessly through infrared or radio frequencies, for example.

Referring more particularly to FIGS. 2-9, DMIA 22 includes an approximately monochromatic illumination source 36, such as a light emitting diode (LED) array or other monochromatic illumination source, transmitting an incident light 38 through a diffuse window 40 along a first optical axis 42 of apparatus 22. Light emitting diode (LED) array 36 can be an approximately 13×9 array of individual LEDs operating in the 495-505 nm wavelength region, although array 36 is not limited to such parameters. The relatively monochromatic nature of source 36 helps reduce chromatic aberration in DMIA 22, thereby improving the optical resolution of the images produced. Diffuse window 40 can be a frosted glass which diffuses the light emanating from array 36, thereby creating a more uniform illumination source. DMIA 22 can include cover 43 to help protect the inner elements of DMIA 22.

A microform media support 44 is configured to support a microform media 46 after diffuse window 40 and along first optical axis 42. In the embodiment shown support 44 is an X-Y table, that is, support 44 is movable in a plane which is approximately orthogonal to first optical axis 42. Referring particularly to FIGS. 3A and 3B, microform media support 44 includes frame 48 which supports first window 50 on one side of microform media 46, and second window 52 on the other side of microform media 46. Second window 52 hinges upward at 54 when frame 48 is moved forward to the extent that lever 56 (connected to second window 52) contacts ramps 58 (one ramp on either side), and similarly, hinges downward at 54 when frame 48 is moved rearward as lever 56 is released from contact with ramp 58. In this way the microform media 46, shown as a microfiche film with an array of images 60, can be placed and held securely between windows 50, 52 for viewing. Frame 48, along with windows 50, 52 and media 46, are slidingly supported on rods 62 by bearings (not shown) to allow a transverse movement 63 of frame 48, windows 50, 52 and media 46. Rods 62 are connected to brackets 64, which brackets are slidingly supported by chassis 66 and bearings (not shown) to allow a longitudinal movement 68 of frame 48, windows 50, 52, media 46 and rods 62.

Figure 6:
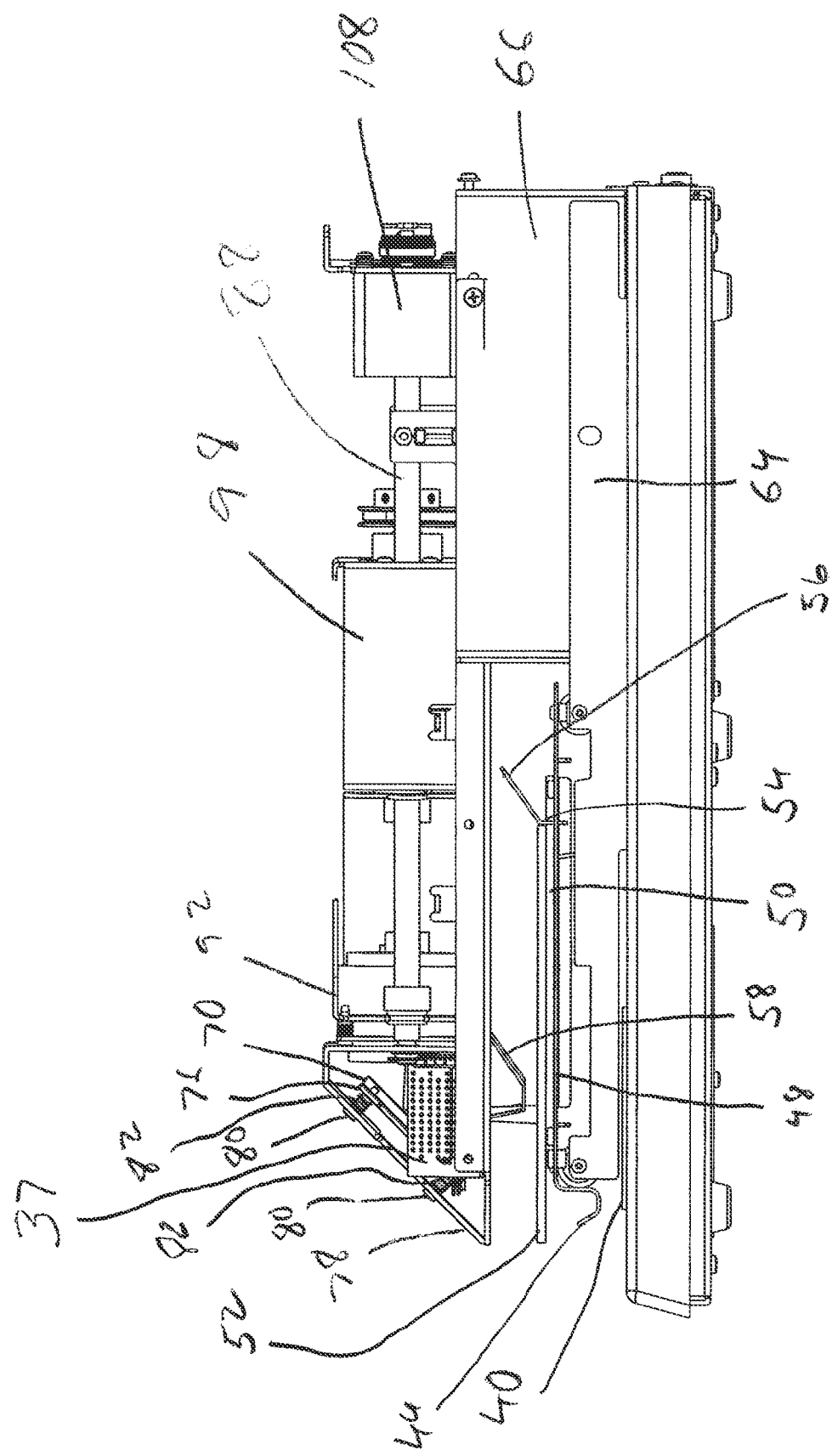
FIG. 6 is a side view of the digital microform imaging apparatus of FIG. 4.
Figure 7:
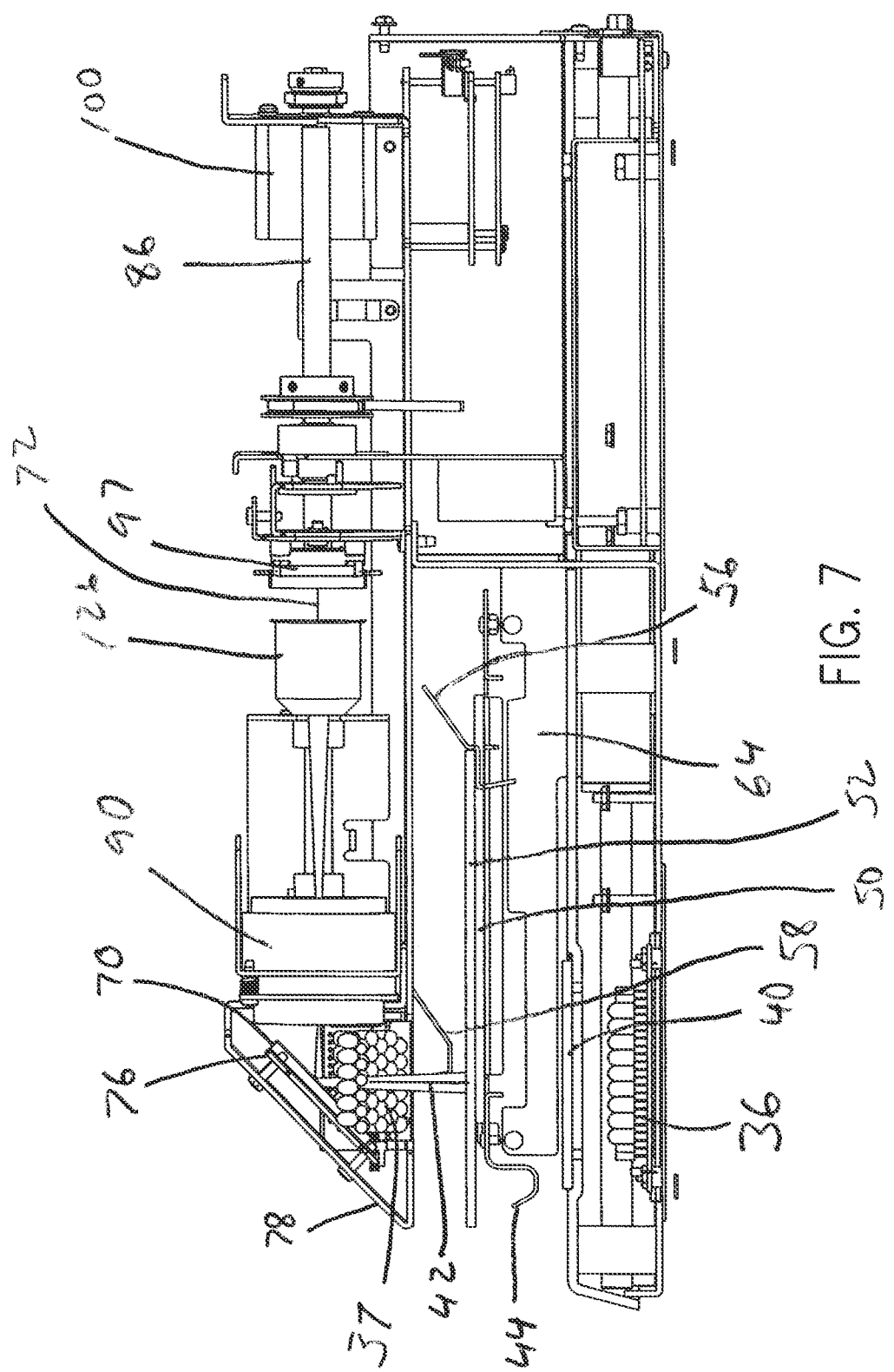
FIG. 7-7 is a cross-sectional view taken along section line 7-7 in FIG. 3A.
Figure 8:
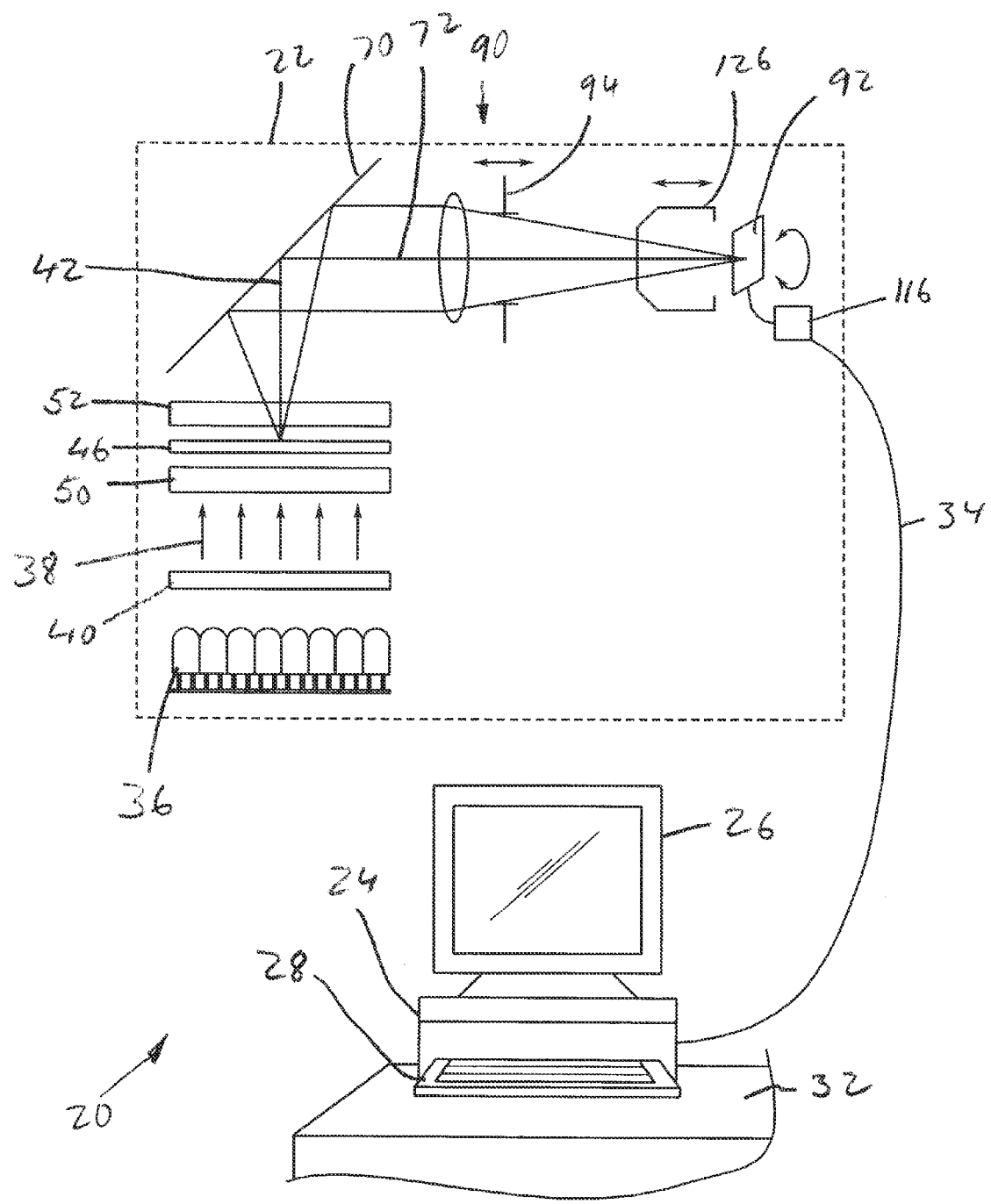
FIG. 8 is a schematic view of the digital microform imaging system of FIG. 1.
Figure 4:
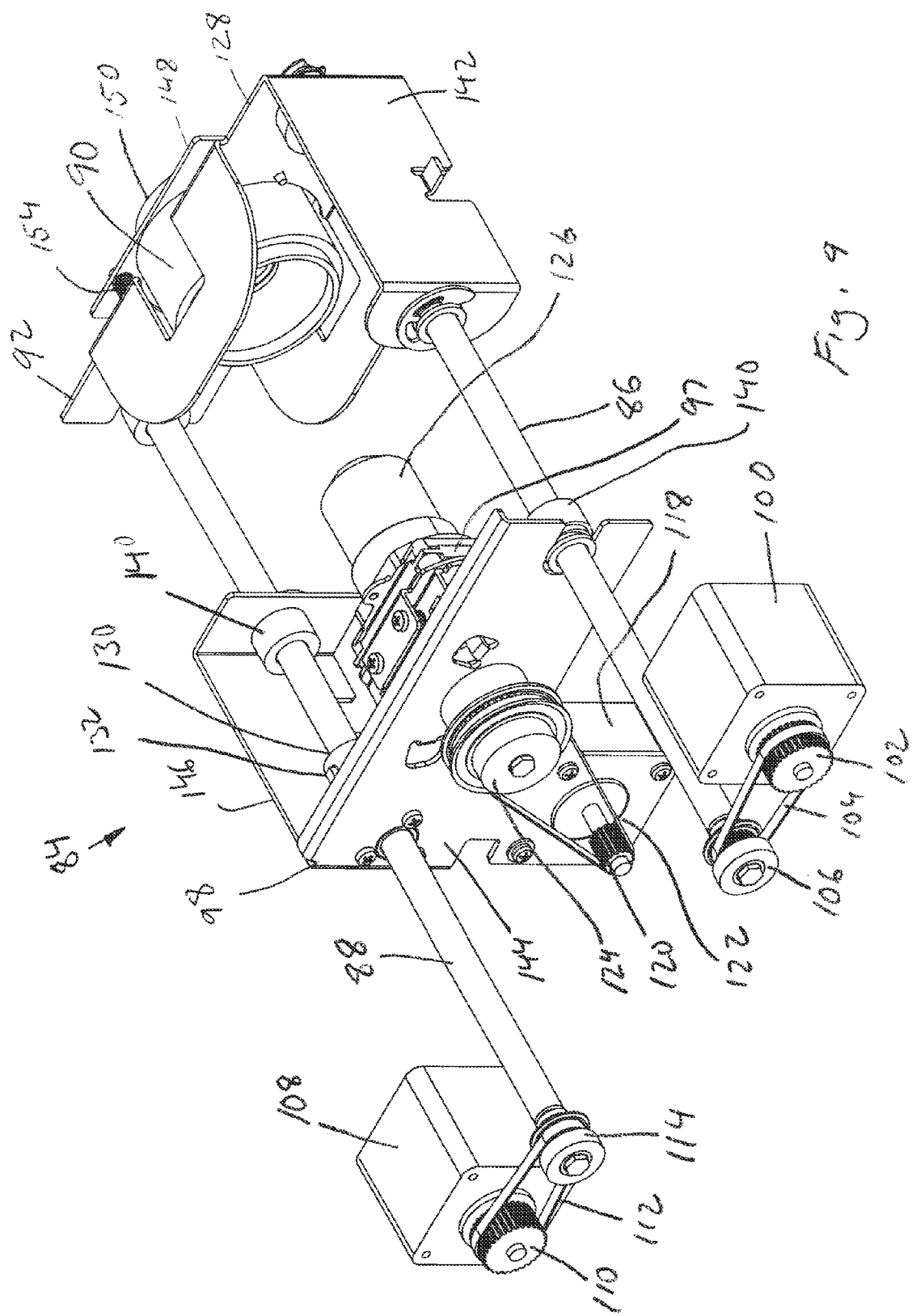

Referring particularly to FIGS. 6-8, an approximately 45° fold mirror 70 reflects the incident light transmitted through microform media 46 approximately 90° along a second optical axis 72. First optical axis 42 and second optical axis 72 can be thought of as segments of the single or main optical axis. Mirror 70 is connected by a three point mount 76 to mirror mount 78 by fasteners 80 and springs 82. Mirror mount 78 is connected to chassis 66 as shown. Fold mirror 70 advantageously shortens the overall longitudinal length of the optical axis which allows DMIA 22 to be more compact.

An imaging subsystem 84 includes a first lead screw 86 and a second lead screw 88 where each lead screw is approximately parallel with second optical axis 72. A lens 90 is connected to a first carriage 92 which is linearly adjustable by rotating first lead screw 86. Lens 90 includes stop 94 and f-stop adjustment 96 which can adjust the aperture of stop 94. Lens 90 can have a fixed focal length of 50 mm, for example. This focal length has the advantage of a relatively large depth of focus. A rough formula used to quickly calculate depth of focus is the product of the focal length times the f-stop divided by 1000, which yields a depth of focus of 0.55 mm for a 50 mm focal length and f11 f-stop adjustment. An area sensor 97 is connected to a second carriage 98 which carriage is linearly adjustable by rotating second lead screw 88. Area sensor 97 can be an area array CCD sensor with a two dimensional array of sensor elements or pixels, for example, with a 3.5 $\mu m^2$ pixel size, or other types of sensors and pixel sizes depending on resolution size requirements. The area array nature of sensor 97, when compared to a line sensor, eliminates the need for scanning of the sensor when viewing two dimensional images. The overall novel optical layout of the present invention including the separately adjustable area sensor 97 and lens 90; 45° fold mirror 70; and film table 44 location; algorithms for moving the lens and sensor to appropriate respective locations to achieve proper magnification and focus of the image; and the lens focal length and relatively large depth of focus, allows DMIA 22 to autofocus without the need for iterative measurements and refocusing the of lens 90 during magnification changes to accommodate different reduction ratios of different film media. Further, the present invention can easily accommodate reduction ratios in the range of 7× to 54×, although the present invention is not limited to such a range.

A first motor 100 is rotationally coupled to first lead screw 86 by timing pulley 102, belt 104 with teeth, and timing pulley 106, and a second motor 108 is rotationally coupled to second lead screw 88 by timing pulley 110, belt 112 with teeth, and timing pulley 114. A controller 116 is electrically connected to first motor 100, second motor 108 and area sensor 97, where controller 116 is for receiving commands and other inputs from computer 24 or other input devices, controlling first motor 100 and second motor 108, and other elements of DMIA 22, and for outputting an image data of area sensor 97. Consequently, controller 116 can include one or more circuit boards which have a microprocessor, field programmable gate array, application specific integrated circuit or other programmable devices; motor controls; a receiver; a transmitter; connectors; wire interconnections including ribbon wire and wiring harnesses; a power supply; and other electrical components. Controller 116 also provides electrical energy and lighting controls for LED array 36. The lead screws serve a dual function of providing guiding elements as well as drive elements for lens and sensor carriages. It is contemplated that the present invention can include alternate designs which can separate these two functions of guiding and driving using, for example, rails or unthreaded rods or a combination thereof for guiding, and a belt or rack and pinion arrangement or a combination thereof for driving.

A third motor 118 is rotationally coupled to area sensor 97, where controller 116 additionally controls third motor 118 through electrical connections as with motors 100 and 108. For example, controller 116 can rotate area sensor 97, using motor 118, timing pulley 120, belt 122 with teeth, and timing pulley 124, to match an aspect ratio of microform media 46, and particularly an aspect ratio of images 60. A light baffle 126 can be connected to area sensor 97 to reduce stray light incident on sensor 97 and thereby further improve the resolution and signal to noise of DMIA 22. Light baffle 126 can have an antireflective coating at the front and inside surfaces of the baffle to further reduce stray light incident on sensor 97. Motors 100, 108 and 118 can be DC servomotors, or other motors.

In order to autofocus DMIA 22 without iterations and successive measurements, and for other reasons, it is important that backlash is minimized or eliminated when rotating lead screws 86, 88 to linearly actuate carriages 92, 98. Further, lens 90 and area sensor 97 require a stable platform in order to maintain optical alignment. Referring more particularly to FIGS. 10 and 11 there is shown in detail lens carriage assembly 127 and area sensor carriage assembly 129, respectively. First carriage 92 can be L-shaped with a first leg 128 threadingly coupled to first lead screw 86 using a tubular fitting 130 coaxially mounted with first lead screw 86 and a toothed insert 132 inserted into slot 134 in tubular fitting 130 threadingly engaging at least some of the threads of first lead screw 86. A biasing element in the form of O-ring 136, for example, holds toothed insert 132 in slot 134 and biases toothed insert 132 against the threads of first lead screw 86. The threads of lead screws 86, 88 are approximately rectangular in profile, and teeth 138 of toothed insert 132 are triangular. Further, lead screws 86, 88 can be made from stainless steel whereas toothed insert 132 can be made from a self lubricating polymer such as polyoxymethylene, sometimes referred by the brand name Delrin, or other Nylon-based products such as Nylatron, or other materials. When triangular teeth 138 are inserted into corresponding rectangular threads of lead screws 86, and biased thereto with O-ring 136, one edge of each tooth is always engaging a corresponding edge of the rectangular thread, and the other edge of each tooth is always engaging the other corresponding edge of the rectangular thread. In this way backlash is eliminated because teeth 138 are immediately engaged with the threads regardless of clockwise or counterclockwise motion of the lead screws, and also regardless of their just previous clockwise or counterclockwise motion. First leg 128 is also slidingly coupled to second lead screw 88 with a bushing 140. A second leg 142 is connected to first leg 128, the second leg slidingly coupled to first lead screw 86 with another bushing 140. In a similar manner, second L-shaped carriage 98 includes a third leg 144 threadingly coupled to second lead screw 88 using another tubular fitting 130, toothed insert 132 and O-ring 13, and slidingly coupled to first lead screw 86 using a bushing 140. A fourth leg 146 is connected to third leg 144, where fourth leg 146 is slidingly coupled to second lead screw 88 using another bushing 140.

Lens carriage assembly 127 can include a three point adjustable mount for lens 90 by mounting lens 90 to first carriage 92 using plate 148, ring 150, fasteners 152 and springs 154.

Figure 12:
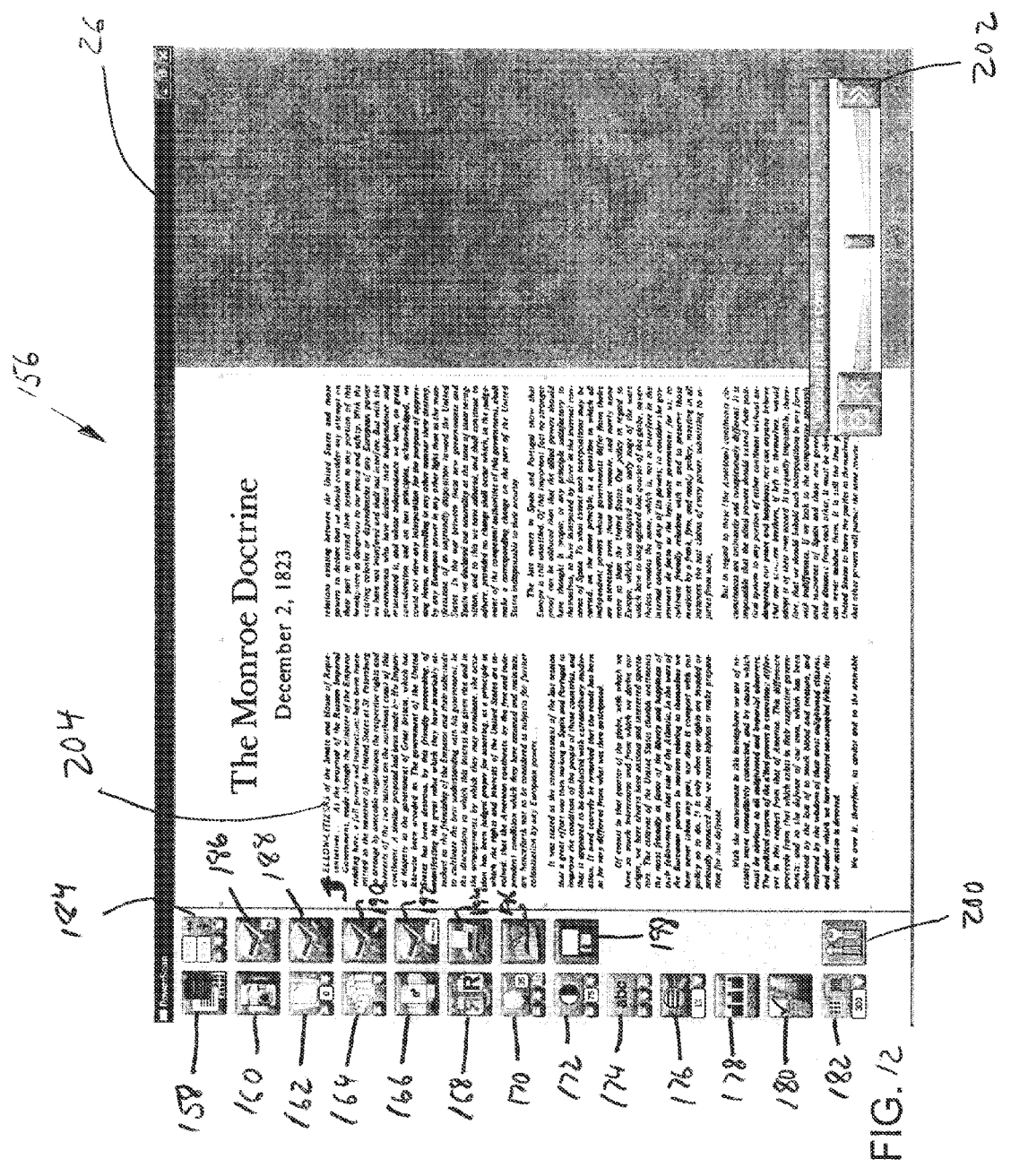

Computer 24 can include a software computer user interface (CUI) 156 displayed by display 26 with user inputs to control DMIA 22 in general, and particularly, illumination system 36, motors 100, 108 and 118, and other elements of DMIA 22. Referring to FIG. 12, CUI 156 can include the following software user input buttons: positive/negative film type 158; landscape/portrait film orientation 160; rotate optical 162 for rotating third motor 118; optical zoom 164 which controls first motor 100 and second motor 108; digital image rotation 166; mirror image 168 for adjusting for when media 46 is placed on support 44 upside down; brightness 170 which adjusts the speed of sensor 97; contrast 172; focus 174 with manual focus (−/+) and autofocus (AF), also controlling first motor 100; digital magnifier 176; live button 178; scan type/selecting grayscale, grayscale enhanced, halftone 180; resolution/image capture 182; scan size button for prints/fit to page 184; save image scan to computer drive #1 186; save image scan to computer drive #2 188; save image scan to computer drive #3 190; save image scan to email 192; print image 194; restore settings 196; save settings 198; setup/tools 200; and motorized roll film controls 202 for embodiments with motorized roll film attachments. A programmer with ordinary skill in the art in Windows, or other, operating systems, and C++ or Visual Basic programming language can create the CUI 156 as shown in FIG. 12 and defined above. CUI 156 images the image data 204 from sensor 97 on display 26.

Illumination source 36 can alternatively include lasers or laser diodes, electroluminescent panels, light sources with narrow band light filters, or other monochromatic sources. Media 46 can include any microform image formats such as microfilm/microfiche, aperture cards, jackets, 16 mm or 35 mm film roll film, cartridge film and other micro opaques. Micro opaques are different than transparent film. Images are recorded on an opaque medium. To view these micro images one needs to use reflected light. The present invention can use LED arrays 37 (FIGS. 6 and 7) for use with micro opaques, which can be the same, or similar to, the monochromatic LED's that are used in illumination source 36.

Figure 13:
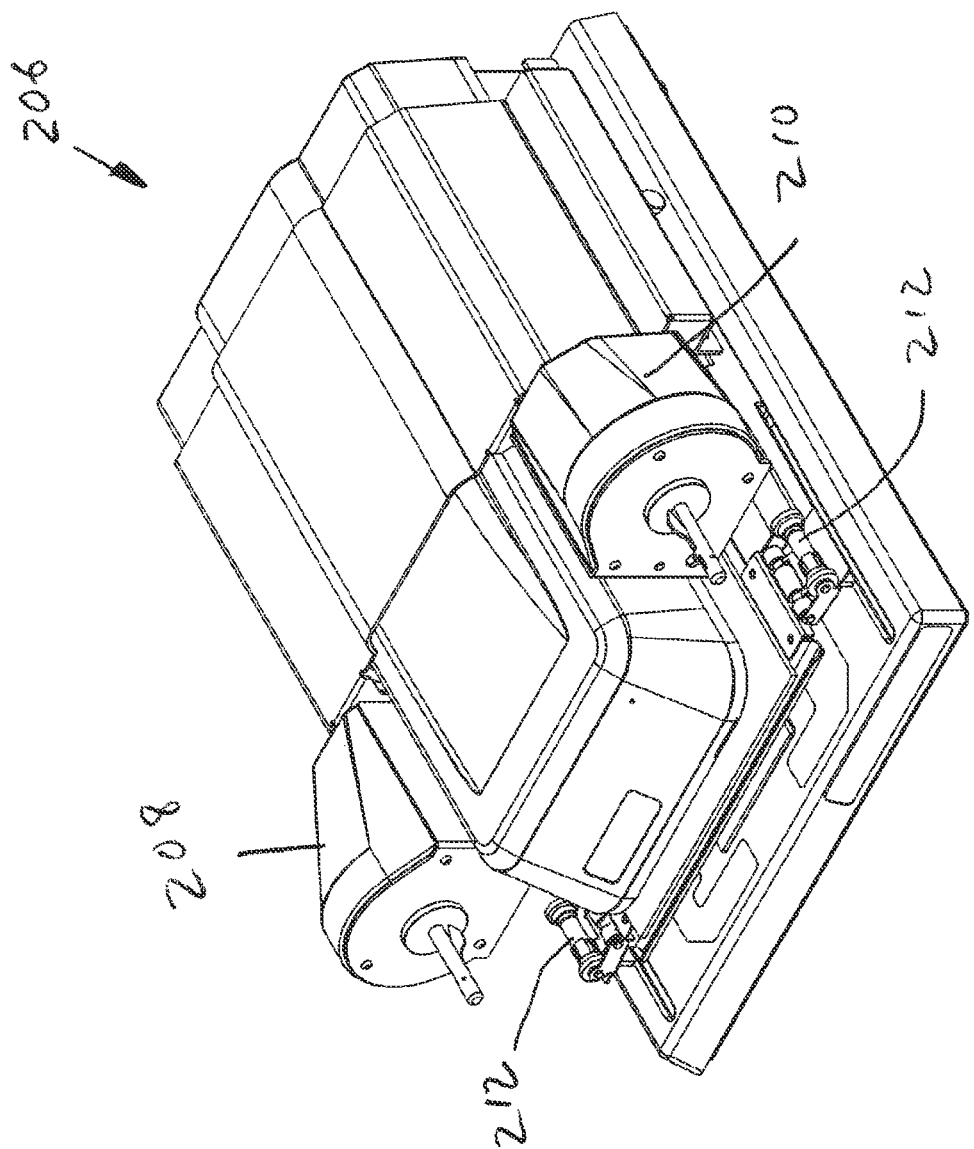
FIG. 13 is a perspective view of another embodiment of a digital microform imaging apparatus according to the present invention, particularly illustrating a motorized roll film microform media support.

In the embodiment of FIG. 13, DMIA 206 includes a microform media support in the form of motorized roll film attachment which has a supply side 208 and a take up side 210 and film guides 212, in addition to X-Y table 44. In the embodiment of FIG. 14, DMIA 214 includes a microform media support in the form of hand operated roll film attachment which has a supply side 216 and a take up side 218 with cranks 220, and film guides 222, in addition to X-Y table 44. In other ways, DMIAs 206 and 214 are similar to or the same as DMIA 22. Therefore, the microform media support structure according to the present invention is at least one of a X-Y table, a motorized roll film carrier, and a hand operated roll film carrier, and a cartridge film carrier.

A preferred embodiment of the invention has been described in considerable detail. Many modifications and variations to the preferred embodiment described will be apparent to a person of ordinary skill in the art. Therefore, the invention should not be limited to the embodiments described. Rather, in order to ascertain the full scope of the invention, the claims which follow should be referenced.

I claim:

1. A digital microform imaging apparatus, comprising:
   a chassis;
   a fold mirror supported by the chassis;
   a first elongated and substantially strait lead member supported by the chassis;
   a second elongated and substantially strait lead member approximately parallel with the first lead member and extending alongside the first lead member, the second lead member supported by the chassis;
   a first carriage slidingly coupled to the first lead member;
   a second carriage slidingly coupled to the second lead member;
   an area sensor supported by the first carriage for movement therewith to adjust a distance between the area sensor and the fold mirror;
   a lens supported by the second carriage for movement therewith, the lens positioned between the area sensor and the fold mirror;
   a first motor linked to the first carriage for moving the first carriage within a range of motion along at least a portion of the first lead member; and
   a second motor linked to the second carriage for moving the second carriage within a range of motion along at least a portion of the second lead member.

2. The apparatus of claim 1 further including a first driving subassembly that links the first motor to the first carriage and a second driving subassembly that links the second motor to the second carriage where the first and second driving subassemblies include first and second belts, respectively.

3. The apparatus of claim 2 wherein the first belt is a toothed belt and the second belt is a toothed belt.

4. The apparatus of claim 3 wherein the first and second motors include motor shafts, the first and second driving subassemblies further including a first timing pulley coupling the first belt to the first motor shaft and a second timing pulley coupling the second belt to the second motor shaft, respectively.

5. The apparatus of claim 4 wherein the first and second carriages are coupled to the first and second lead members via first and second bushings, respectively.

6. The apparatus of claim 1 wherein the range of motion of the first carriage at least partially overlaps the range of motion of the second carriage.

7. The apparatus of claim 1 wherein the first carriage is also coupled to the second lead member for motion there along and wherein the second carriage is also coupled to the first lead member for motion there along.

8. The apparatus of claim 1 wherein the first and second lead members are spaced apart, the first carriage extends between the first and second lead members and the second carriage extends between the first and second lead members.

9. The apparatus of claim 8 wherein the lens and the area sensor are at least partially located between the first and second lead members.

10. The apparatus of claim 9 wherein the lens is located between the first and second lead members.

11. The apparatus of claim 9 wherein the fold mirror is aligned along an optical axis with the lens and the area sensor.

12. The apparatus of claim 11 wherein the optical axis is substantially parallel to a length dimension of each of the first and second lead members.

13. The apparatus of claim 12 wherein each of the first and second lead members includes first and second ends and wherein the fold mirror is supported adjacent the first ends of the lead members.

14. The apparatus of claim 13 wherein the first motor is located on a side of the first lead member opposite the side on which the second lead member is located and the second motor is located on a side of the second lead member opposite the side on which the first lead member is located.

15. The apparatus of claim 14 further including a cover subassembly supported by the chassis, the cover subassembly forming an enclosed space, the motors, area sensor, lens and fold mirror located within the enclosed space, the cover subassembly including front and rear ends proximate first and second ends of the first and second lead members and having first and second width dimensions, respectively, the first width dimension being less than the second width dimension.

16. The apparatus of claim 15 wherein the rear end extends outward from the front end to opposite sides, the first and second motors located within portions of the enclosed space formed by the rear end of the cover subassembly.

17. The apparatus of claim 16 further including a supply side roll film attachment and a take up side roll film attachment supported by the chassis adjacent opposite sides of the front end of the cover subassembly.

18. The apparatus of claim 13 further including a microform media support structure configured to support a microform media within a plane that is optically aligned with the fold mirror, the first ends of the first and second lead members located above at least a portion of the media support structure.

19. The apparatus of claim 18 wherein the range of motion for the first carriage includes at least some positions in which the lens is located above at least portions of the media support structure.

20. The apparatus of claim 1 wherein the first and second carriages are coupled to the first and second lead members via first and second bushings, respectively.

21. The apparatus of claim 1 wherein each of the first and second lead members includes first and second ends and wherein the fold mirror is supported adjacent the first ends of the lead members.

22. The apparatus of claim 21 wherein the first and second lead members are separated by a space and wherein the fold mirror is located outside the space between the first and second lead members.

23. The apparatus of claim 1 wherein the first and second lead members include first and second lead screws.

24. The apparatus of claim 1 wherein the first and second lead members include length dimensions that extend substantially horizontally.

25. The apparatus of claim 1 further including a microform media support structure supported by the chassis and configured to support a microform media within a plane substantially orthogonal to a first optical axis that is aligned with the fold mirror, the fold mirror reflecting light from the first optical axis along a second optical axis aligned with the lens and the area sensor.

26. The apparatus of claim 1 further including a controller for controlling the simultaneous movement of the first and second carriages to accomplish zoom while substantially maintaining focus.

27. The apparatus of claim 26 further including an electronic display for receiving images obtained by the area sensor and displaying the images while the controller controls carriage movement.

28. The apparatus of claim 1 wherein the area sensor is mounted to rotate about an axis that is perpendicular to the area of the sensor.

29. The apparatus of claim 28 wherein the area sensor is mounted to rotate between at least two positions so that the sensor is alignable to obtain images of portrait and landscape microform images.

30. The apparatus of claim 1 wherein the first and second lead members include first and second rods.

31. The apparatus of claim 1 wherein the first and second lead members form a space there between and each includes first and second ends, the fold mirror is supported adjacent the first ends of the first and second lead member, the first and second motors are located proximate the second ends of the first and second lead members, the first motor is located on a side of the first lead member opposite the side on which the second lead member is located and the second motor is located on a side of the second lead member opposite the side on which the first lead member is located.

32. The apparatus of claim 31 further including a first belt coupled between the first motor and the first carriage and including a second belt coupled between the second motor and the second carriage.

33. The apparatus of claim 1 wherein the fold mirror is aligned along a first optical axis with a viewing area in which microform media is supportable, the fold mirror reflecting light from the first optical axis along a second optical axis that is aligned with the lens and the area sensor.

34. The apparatus of claim 33 further including an illumination device generating and directing light toward the viewing area to light up a microform media when the media is supported within the viewing area.

35. A digital microform imaging apparatus, comprising:
   a chassis;
   a fold mirror supported by the chassis, the fold mirror including a reflecting surface for directing light from a first optical axis to a second optical axis;
   a microform media support structure aligned with the first optical axis;
   a first elongated lead member supported by the chassis and extending substantially parallel to the second optical axis;
   a second elongated lead member supported by the chassis and extending substantially parallel to the second optical axis, the second lead member spaced apart from the first lead member and extending along the side of the first lead member;
   a first carriage slidingly coupled to the first lead member;
   a second carriage slidingly coupled to the second lead member;
   first and second drive motors;
   a first driving mechanism extending at least in part substantially parallel to the second lead member, the first drive mechanism linking the first motor to the first carriage and controllable to drive the first carriage along the second optical axis;
   a second driving mechanism extending at least in part substantially parallel to the first lead member, the second drive mechanism linking the second motor to the second carriage and controllable to drive the second carriage along the second optical axis;

an area sensor supported by the first carriage for movement therewith to adjust a distance between the area sensor and the fold mirror; and a lens supported by the second carriage for movement therewith, the lens positioned between the area sensor and the fold mirror.

36. The apparatus of claim 35 wherein a first lead member forms the first lead member and the second driving mechanism and a second lead member forms the second lead member and the first driving mechanism.

37. The apparatus of claim 36 wherein the first and second lead members include first and second threaded shafts.

38. The apparatus of claim 35 wherein the first driving mechanism includes a first toothed belt and the second driving mechanism includes a second toothed belt.

39. The apparatus of claim 38 wherein the first lead member includes a first elongated shaft and the second lead member includes a second elongated shaft, the apparatus further including a first bushing coupling the first carriage to the first elongated shaft and a second bushing coupling the second carriage to the second elongated shaft.

40. The apparatus of claim 35 wherein the first carriage is also coupled to the second lead member and the second carriage is also coupled to the first lead member.

41. The apparatus of claim 40 wherein each of the first and second lead members including first and second ends, the fold mirror is located proximate the first ends of the lead members, the motors are located proximate the second ends of the lead members, at least a portion of the fold mirror is located at a height above a height of the lead members and the media support structure is located below the height of the lead members.

42. The apparatus of claim 41 wherein the lens is positioned between the first and second lead members.

43. The apparatus of claim 35 wherein the first motor is controllable to drive the first carriage along the second optical axis among a range of positions and the second motor is controllable to drive the second carriage along the second optical axis among a range of positions that overlaps the range of positions of the first carriage.

44. A digital microform imaging apparatus, comprising:
a chassis;
a fold mirror supported by the chassis;
a first elongated and substantially strait lead member supported by the chassis;
a first carriage slidingly coupled to the first lead member;
an area sensor supported by the first carriage for movement therewith to adjust a distance between the area sensor and the fold mirror;
a lens supported by the chassis and positioned between the area sensor and the fold mirror; and
a first motor coupled to the first carriage via a first belt for moving the first carriage within a range of motion along at least a portion of the first lead member.

45. A digital microform imaging apparatus, comprising:
a chassis including a microform media support structure configured to support a microform media;
an illumination source directing light toward the microform media supported by the support structure to generate an image of the microform media that is projected along an optical axis;
a lens supported along the optical axis;
an area sensor supported along the optical axis to sense the projected image, the area sensor supported for rotation about an axis parallel to the optical axis;
a first adjuster for moving the area sensor along at least a portion of the optical axis; and
a second adjuster for moving the lens along at least a portion of the optical axis;
a controller for controlling the first and second adjusters to simultaneously reposition the lens and area sensor to affect a change in magnification while adjusting focus; and
an electronic display for receiving images obtained by the area sensor and displaying the images during zooming and focusing processes.

46. The apparatus of claim 45 wherein a range of motion of the lens overlaps a range of motion of the area sensor.

47. A digital microform imaging apparatus comprising:
a chassis;
a first elongated and substantially strait lead member supported by the chassis and having first and second ends;
a second elongated and substantially strait lead member supported by the chassis approximately parallel with the first lead member and extending alongside the first lead member and having first and second ends, the first and second lead members located at a first height;
a fold mirror supported by the chassis proximate the first ends of the first and second lead members, the fold mirror including a reflecting surface for directing light from a first optical axis to a second optical axis, at least a portion of the reflecting surface located at a height above the first height;
a microform media support structure aligned with the first optical axis and located at a height below the first height;
a first carriage slidingly coupled to the first lead member and extending between the first and second lead members;
a second carriage slidingly coupled to the second lead member and extending between the first and second lead members;
an area sensor supported by the first carriage for movement therewith to adjust a distance between the area sensor and the fold mirror;
a lens supported by the second carriage for movement therewith, the lens positioned between the area sensor and the fold mirror;
first and second motors supported by the chassis proximate the second ends of the first and second lead members;
a first toothed belt coupled to the first motor and to the first carriage for driving the first carriage within a range of motion along at least a portion of the first lead member; and
a second toothed belt coupled to the second motor and to the second carriage for driving the second carriage within a range of motion along at least a portion of the second lead member.

48. The apparatus of claim 47 wherein the first motor is located on a side of the first lead member opposite the side on which the second lead member is located and wherein the second motor is located on a side of the second lead member opposite the side on which the first lead member is located.

49. A digital microform imaging apparatus, comprising:
a chassis;
a fold mirror supported by the chassis and including a reflecting surface aligned with first and second optical axis;
a first elongated and substantially strait lead member supported by the chassis, the first lead member substantially parallel to the second optical axis;

a first driving mechanism supported by the chassis and extending alongside and spaced apart from the first lead member;

a first motor supported by the chassis and linked to the first driving mechanism, the first motor having a first shaft;

a first carriage extending between the first lead member and the first driving mechanism, the first carriage slidingly coupled to the first lead member and linked to the first driving mechanism, wherein, rotation of a first shaft causes the first driving mechanism to move the first carriage along the first lead member among positions within a range;

an area sensor supported by the first carriage for movement therewith to adjust a distance between the area sensor and the fold mirror, the area sensor aligned along the second optical axis and positioned at least in part between the first lead member and the first driving mechanism;

a lens supported by the chassis along the second optical axis and positioned between the area sensor and the fold mirror.

50. The apparatus of claim 49 further including a second elongated and substantially strait lead member supported by the chassis, the second lead member substantially parallel to the first lead member;

a second driving mechanism supported by the chassis and extending alongside and spaced apart from the second lead member;

a second motor supported by the chassis and linked to the second driving mechanism, the second motor having a second shaft;

a second carriage extending between the second lead member and the second driving mechanism, the second carriage slidingly coupled to the second lead member and linked to the second driving mechanism, wherein, rotation of a second shaft causes the second driving mechanism to move the second carriage along the second lead member among positions within a range; and the lens supported by the second carriage for movement therewith to adjust a distance between the lens and the fold mirror, the lens positioned at least in part between the second lead member and the second driving mechanism.

51. The apparatus of claim 50 the first and second lead members include first and second elongated shafts, respectively.

52. The apparatus of claim 51 wherein each of the first and second elongated shafts is threaded, the threads forming the first and second driving mechanisms.

53. The apparatus of claim 50 wherein the range of positions of the second carriage overlaps the range of positions of the first carriage.

* * * * *

UNITED STATES PATENT AND TRADEMARK OFFICE
CERTIFICATE OF CORRECTION

PATENT NO. : 8,537,279 B2
APPLICATION NO. : 13/560283
DATED : September 17, 2013
INVENTOR(S) : Todd A Kahle Page 1 of 1

It is certified that error appears in the above-identified patent and that said Letters Patent is hereby corrected as shown below:

In the Claims

Column 8, line 17, "strait" should be --straight--.

Column 8, line 19, "strait" should be --straight--.

Column 11, line 46, "strait" should be --straight--.

Column 12, line 17, "strait" should be --straight--.

Column 12, line 19, "strait" should be --straight--.

Column 12, line 65, "strait" should be --straight--.

Column 13, line 22, "strait" should be --straight--.

Signed and Sealed this
Nineteenth Day of November, 2013

Teresa Stanek Rea
*Deputy Director of the United States Patent and Trademark Office*